United States Patent
Remboski et al.

(10) Patent No.: US 7,570,597 B2
(45) Date of Patent: Aug. 4, 2009

(54) DISCOVERY PROCESS IN A VEHICLE NETWORK

(75) Inventors: Donald Remboski, Dearborn, MI (US); Jürgen Reinold, Palatine, IL (US); Patrick Jordan, Austin, TX (US); Walton Fehr, Mundelein, IL (US); Samuel M. Levenson, Arlington Heights, IL (US); Hai Dong, Austin, TX (US); Hugh Johnson, Cedar Park, TX (US)

(73) Assignee: Temic Automotive of North America, Inc., Deer Park, IL (US)

( * ) Notice: Subject to any disclaimer, the term of this patent is extended or adjusted under 35 U.S.C. 154(b) by 1331 days.

(21) Appl. No.: 10/463,988

(22) Filed: Jun. 18, 2003

(65) Prior Publication Data

US 2004/0258001 A1 Dec. 23, 2004

Related U.S. Application Data (60) Provisional application No. 60/477,897, filed on Jun. 12, 2003.

(51) Int. Cl.
*H04L 12/26* (2006.01)
(52) U.S. Cl. .......................................... 370/248; 701/36
(58) Field of Classification Search ................. None
See application file for complete search history.

(56) References Cited

U.S. PATENT DOCUMENTS

| | | | |
|---|---|---|---|
| 5,323,385 A | 6/1994 | Jurewicz et al. | |
| 5,524,213 A | 6/1996 | Dais et al. | |
| 5,596,722 A | 1/1997 | Rahnema | |
| 5,629,928 A | 5/1997 | Calvignac et al. | |
| 5,732,074 A | 3/1998 | Spaur et al. | |
| 5,881,316 A | 3/1999 | Chaney et al. | |
| 6,243,759 B1 * | 6/2001 | Boden et al. | 709/238 |
| 6,252,614 B1 | 6/2001 | Mullin | |
| 6,252,884 B1 | 6/2001 | Hunter | |
| 6,259,699 B1 | 7/2001 | Opalka et al. | |
| 6,292,862 B1 | 9/2001 | Barrenscheen et al. | |
| 6,349,246 B1 * | 2/2002 | Smith et al. | 701/1 |
| 6,356,823 B1 | 3/2002 | Iannotti et al. | |
| 6,430,164 B1 | 8/2002 | Jones et al. | |
| 6,519,263 B1 | 2/2003 | Huth | |
| 6,542,739 B1 | 4/2003 | Garner | |
| 6,559,783 B1 | 5/2003 | Stokening | |
| 6,611,537 B1 | 8/2003 | Edens et al. | |
| 6,611,755 B1 | 8/2003 | Coffee et al. | |
| 6,631,134 B1 | 10/2003 | Zadikian et al. | |
| 6,747,365 B2 | 6/2004 | Reinold et al. | |
| 6,753,867 B2 | 6/2004 | Mullin | |
| 6,877,048 B2 | 4/2005 | Bilak | |
| 6,934,612 B2 | 8/2005 | Remboski et al. | |
| 7,272,496 B2 | 9/2007 | Remboski et al. | |
| 2001/0001319 A1 | 5/2001 | Beckert et al. | |
| 2002/0044553 A1 | 4/2002 | Chakravorty | |

(Continued)

*Primary Examiner*—Thai D Hoang (57) ABSTRACT

A method of configuring a network within a vehicle, wherein the network includes a plurality of network elements and a plurality of communication links communicatively coupling the plurality of network elements for point-to-point communication, includes storing a last known configuration state of the network. Then, the network is monitored to determine a change in the configuration state of the network to establish a current configuration state. The current configuration state is then point-to-point propagated through the network via the communication links, and is stored at each of the plurality of network elements.

11 Claims, 9 Drawing Sheets

U.S. PATENT DOCUMENTS

| | | |
|---|---|---|
| 2002/0114305 A1 | 8/2002 | Oyama et al. |
| 2002/0132611 A1 | 9/2002 | Immonen et al. |
| 2002/0150050 A1 | 10/2002 | Nathanson |
| 2003/0026268 A1 | 2/2003 | Navas |
| 2003/0033394 A1 | 2/2003 | Stine |
| 2003/0042792 A1 | 3/2003 | Reinold et al. |
| 2003/0043739 A1 | 3/2003 | Reinold et al. |
| 2003/0043750 A1 | 3/2003 | Remboski et al. |
| 2003/0043779 A1 | 3/2003 | Remboski et al. |
| 2003/0043793 A1 | 3/2003 | Reinold et al. |
| 2003/0043799 A1 | 3/2003 | Reinold et al. |
| 2003/0043824 A1 | 3/2003 | Remboski et al. |
| 2003/0045234 A1 | 3/2003 | Remboski et al. |
| 2003/0045971 A1 | 3/2003 | Reinold et al. |
| 2003/0045972 A1 | 3/2003 | Remboski et al. |
| 2003/0046327 A1 | 3/2003 | Reinold et al. |
| 2003/0051131 A1 | 3/2003 | Reinold et al. |
| 2003/0065630 A1 | 4/2003 | Brown et al. |
| 2003/0093798 A1 | 5/2003 | Rogerson |
| 2003/0135639 A1 | 7/2003 | Marejka et al. |
| 2003/0193890 A1* | 10/2003 | Tsillas et al. ................ 370/216 |
| 2003/0204636 A1 | 10/2003 | Greenblat et al. |
| 2003/0222982 A1 | 12/2003 | Hamdan et al. |
| 2004/0001593 A1 | 1/2004 | Reinold et al. |
| 2004/0002794 A1* | 1/2004 | Pillar et al. .................... 701/1 |
| 2004/0002799 A1 | 1/2004 | Dabbish et al. |
| 2004/0003227 A1 | 1/2004 | Reinold et al. |
| 2004/0003228 A1 | 1/2004 | Fehr et al. |
| 2004/0003229 A1 | 1/2004 | Reinold et al. |
| 2004/0003230 A1 | 1/2004 | Puhl et al. |
| 2004/0003231 A1 | 1/2004 | Levenson et al. |
| 2004/0003232 A1 | 1/2004 | Levenson et al. |
| 2004/0003233 A1 | 1/2004 | Reinold et al. |
| 2004/0003234 A1 | 1/2004 | Reinold et al. |
| 2004/0003237 A1 | 1/2004 | Puhl et al. |
| 2004/0003242 A1 | 1/2004 | Fehr et al. |
| 2004/0003243 A1 | 1/2004 | Fehr et al. |
| 2004/0003245 A1 | 1/2004 | Dabbish et al. |
| 2004/0003249 A1 | 1/2004 | Dabbish et al. |
| 2004/0003252 A1 | 1/2004 | Dabbish et al. |
| 2004/0095907 A1 | 5/2004 | Agee |
| 2004/0199664 A1 | 10/2004 | Feldman |
| 2004/0213295 A1 | 10/2004 | Fehr |
| 2004/0227402 A1 | 11/2004 | Fehr et al. |
| 2004/0252697 A1 | 12/2004 | Wille et al. |
| 2004/0254700 A1 | 12/2004 | Fehr et al. |
| 2005/0004727 A1 | 1/2005 | Remboski et al. |
| 2005/0004756 A1 | 1/2005 | Remboski et al. |
| 2005/0038583 A1 | 2/2005 | Fehr et al. |
| 2005/0113988 A1* | 5/2005 | Nasr et al. .................... 701/22 |
| 2005/0243797 A1 | 11/2005 | Schrodi |
| 2006/0020717 A1 | 1/2006 | Remboski et al. |
| 2006/0266273 A1* | 11/2006 | Westberg et al. ........... 116/62.1 |

* cited by examiner

DISCOVERY PROCESS IN A VEHICLE NETWORK

CROSS-REFERENCE TO RELATED APPLICATIONS

This application claims benefit under 35 U.S.C. § 119(e) to provisional patent application Ser. No. 60/477,897 filed Jun. 12, 2003, the disclosure of which is incorporated herein by reference.

TECHNICAL FIELD

The present patent relates to vehicles and particularly to communication networks within vehicles and a discovery process for a vehicle network.

BACKGROUND

Vehicle builders have been using serial communication (multiplexing) between controllers to share information and distribute control for some time. Doing so has greatly reduced the amount of vehicle signal wiring needed to implement the comfort, convenience, and safety features desired in modern consumer vehicles.

Control of the devices in the vehicle to implement desired features may be divided into controllers by function (powertrain, braking, steering, etc.), by location (engine compartment, seat, door, etc.) or in combinations thereof. The controller for each of the functions/zones may share information with other controllers using a shared-access serial bus. The bus usually follows an industry standard such as J1850, CAN, LIN, Flexray, MOST and the like, well known to those of skill in the art. Multiple, independent busses may be used. In that case, one of the controllers may act as a gateway for information between the incompatible busses.

An alternative architecture introduces the idea of dividing the vehicle into geographic regions and locating a single controller for all of the features in that region. This architecture may also include the concept of smart peripherals to reduce the number of interconnections in localized areas of the vehicle. The smart peripherals use simple serial communication busses such as LIN busses to relay information from sensors to the zone controller or to accept actuator commands from the zone controller. The zone controllers may be linked by a serial communication bus structure.

Another alternative architecture incorporates a junction block that can be located in various zones of the vehicle. The junction block provides a mechanical and electrical connection point for power, ground and communication for small devices that are used to interface between input and output devices. The junction block also provides over current protection devices for the small connected devices, and multiple power sources distributed at different levels within the system.

Current bus protocols are not easily scalable and are limited in bandwidth. X-by-wire functionality, multimedia infotainment, navigation and other content intensive applications will put more demands on bandwidth and quality of service (QoS) requiring marked improvements in bandwidth, speed, delay, jitter, fault tolerance, message integrity, guaranteed delivery, availability and survivability.

Therefore, there is needed new architecture, such as switch fabric network architecture, for the automotive environment that provides scalability in both capacity and redundancy, at costs on par with existing bus architecture.

BRIEF DESCRIPTION OF THE DRAWINGS

This disclosure will describe several embodiments to illustrate its broad teachings. Reference is also made to the attached drawings.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Moreover, structure, features and functions of the herein described embodiments should be considered interchangeable, and every structure, feature or function may be used with any of the embodiments herein described.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. § 112, sixth paragraph.

Figure 1:
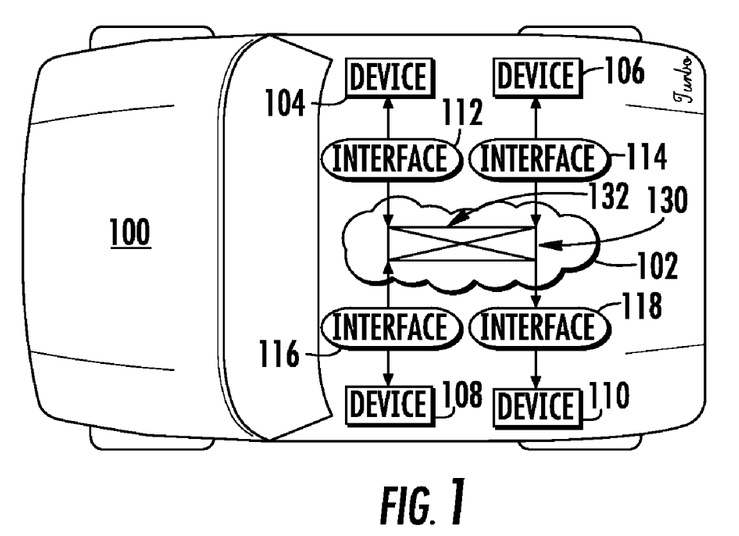
FIG. 1 is a schematic representation of a vehicle incorporating a vehicle network.

FIG. 1 illustrates a vehicle 100 including a network 102 to which various vehicle devices 104-110 are coupled. The devices may be sensors, actuators, processors and the like used in connection with various vehicle functional systems and sub-systems, such as, but not limited to, control-by-wire applications for throttle, braking, steering and suspension control, power accessories, communications, entertainment, and the like. The vehicle devices 104-110 may be coupled by interfaces 112-118, which may be any suitable interface for coupling the particular device to the network 102, and may be wire, optical, wireless or combinations thereof. It should be understood, however, that the interfaces are not required elements and that the devices 104-110 may be directly coupled to the network or may form portions of the network. The vehicle devices 104-110 may be adapted to provide one or more functions associated with the vehicle 100. These devices may be data producing, such as a sensor, data consuming, such as an actuator, processing or other devices, which both produce and consume data, or routing that transport data within the network. Of course, an actuator, typically a data-consuming device, may also produce data, for example where the actuator produces data indicating it has achieved the instructed state, or a sensor may consume data, for example, where it is provided instructions for the manner of function. Data produced by or provided to a device, and carried by the network 102, is independent of the function of the device itself. That is, the interfaces 112-118 may provide device independent data exchange between the coupled device and the network 102.

The network 102 includes a switch fabric 130 defining a plurality of communication paths 132 between the devices. The communication paths permit multiple simultaneous peer-to-peer or point-to-point, one-to-many, many-to-many, etc. data packet communication between the devices 104-110. During operation of the vehicle 100, data exchanged, for example, between devices 104 and 110 may utilize any available path or paths between the devices. In operation, a single path through the switch fabric 130 may carry all of the data packets representing a communication between the device 104 and the device 110, or several communication paths may carry portions of the data packets. Subsequent communications may use the same paths or other paths as dictated by the then state of the network 102. This flexibility provides reliability and speed advantages over bus architectures that are restricted to single communication paths between devices, and hence are subject to failure with failure of the single path or delays based upon congestion of the path. Moreover, communications between other of the devices 104-110 may occur simultaneously using the communication paths within the switch fabric 130.

The network 102 is a packet data network which may comply with a transmission control-protocol/Internet (TCP/IP), asynchronous transfer mode (ATM), Infiniband, RapidIO, or any other packet data protocol now known or later developed. It may also include bus structures that are operated in a packet transit mode, as will be described herein later. As such, the network 102 may use data packets, having fixed or variable length, defined by one or more applicable protocols. For example, if the network 102 uses asynchronous transfer mode (ATM) communication protocol, an ATM standard data cell may be used.

The devices 104-110 need not be discrete devices. Instead, the devices may be systems or subsystems of the vehicle and may include one or more legacy communication media, i.e., legacy bus architectures such as J1850, CAN, LIN, Flexray, MOST or similar bus structures. In such embodiments, the respective interface 112-118 may be configured as a proxy or gateway to permit communication between the active network 102 and the legacy device 104-110.

Figure 2:
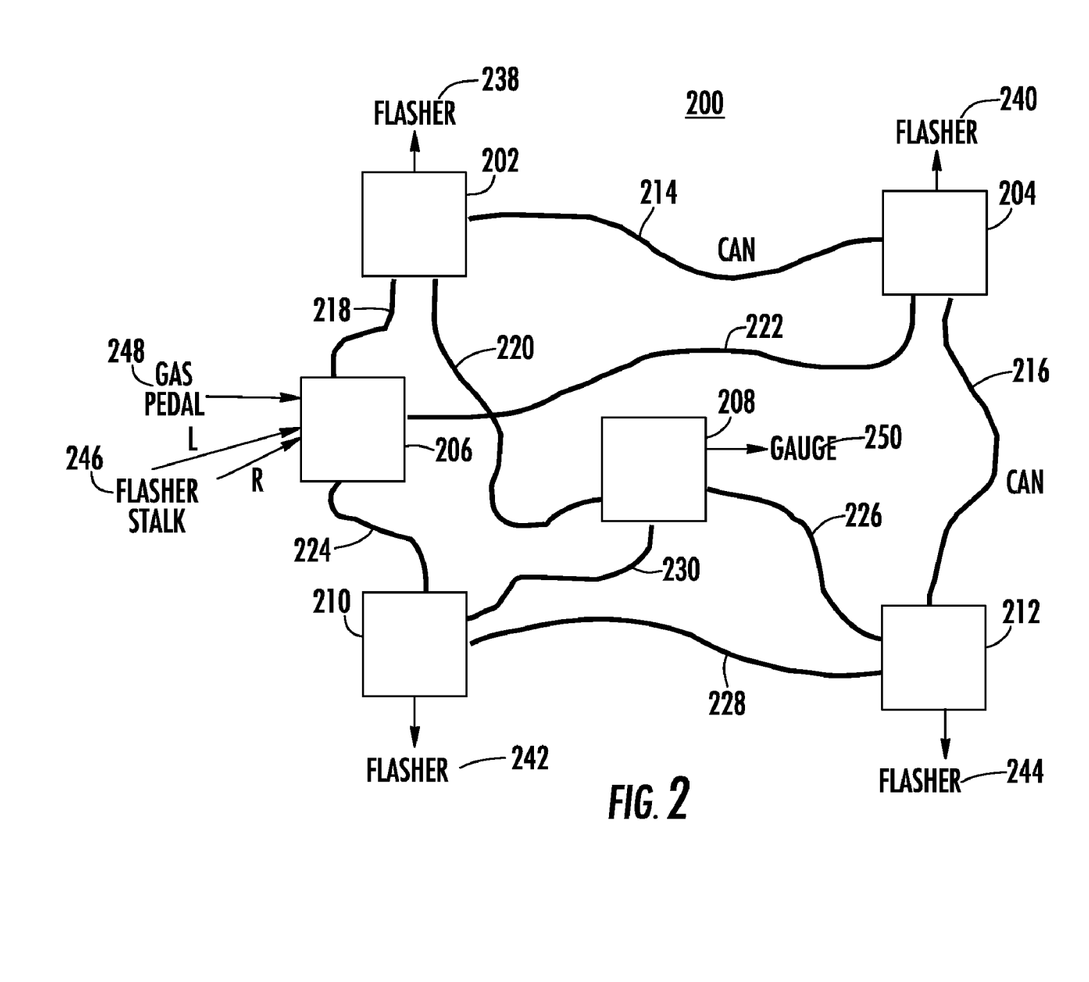
FIG. 2 is a schematic representation of a switch fabric forming a portion of a vehicle network.

FIG. 2 illustrates a network 200 that includes a plurality of network elements 202-212 communicatively coupled by communication links 214-230. A plurality of devices 238-250 are coupled at various locations, i.e., to several of the network elements 202-212 of the network 200 by corresponding communication links (not separately identified). The devices may be any vehicle device such as flashers 238-244, flasher control (stalk switch) 246, gas pedal 248, one or more gauges such as gauge 250 and the like.

The communication links 214-230 may be robust transport media and may be adapted from serial communication architecture as will be described. That is, the communication links 214-230 may be capable of providing guaranteed, reliable message transfer between the network elements. Any given communication link 214-230 may be a single bi-directional link, a single uni-directional link or combinations of bi-directional and uni-directional links or any combination of link technologies. The links may be defined according to an existing, robust transport mechanism designed for the automotive environment such as CAN, LIN, FLEXRAY, J1850, and the like or may be defined according to transport protocols in development or that are later developed. The links may also be combinations of technologies, or specified in accordance with virtually any other protocol.

The network 200 may incorporate at some level a system management function providing supervision, control, diagnostics and other related functionality. This functionality may be provide by way of a separate entity coupled to the network 200, or the functionality may be distributed within the network elements 202-212 or other suitable elements of the network 200.

Figure 3:
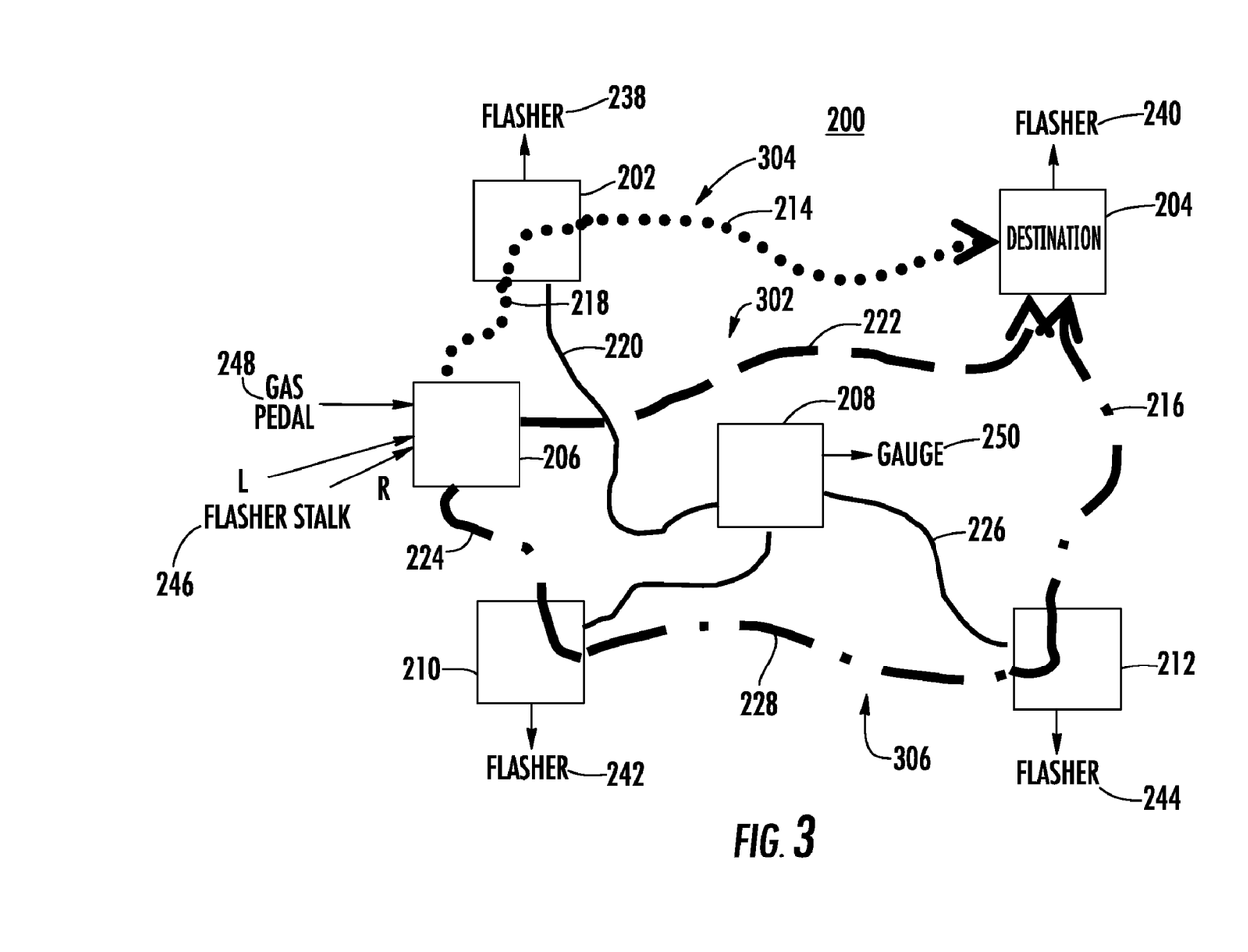
FIG. 3 is a schematic representation of a switch fabric forming a portion of a vehicle network and further illustrating communication paths within the network.

FIG. 3 illustrates the flexibility provided by the network 200. As an example of this flexibility, consider the task of communicating a signal from the flasher control 246 to the flasher 240. The network 200 is a packet based network, and permits any available communication path from a source point to a destination point to be used regardless of the communication media. As shown in FIG. 3, the signal from the flasher control 246 may traverse a relatively direct path 302 between the flasher control 246 defined by the network elements 206 and 204 and the communication link 222 joining them. Alternatively, a path 304 via the network elements 206, 202 and 204 and the communication links 218 and 214 joining them may be used. Still a further path 306 via the network elements 206, 210, 212 and 204 and the communication links 224, 228 and 216 may be used. As this example clearly reveals numerous communication paths may be defined. The availability of multiple paths allows the network to manage traffic to avoid congestion on one or more of the communication links 214-232 or at one or more of the network elements 202-212. The availability of multiple communication paths also permits fault tolerance in the event of failure of one or more network elements and/or communication links by permitting a communication path to be established bypassing the failed elements/links.

Figure 4:
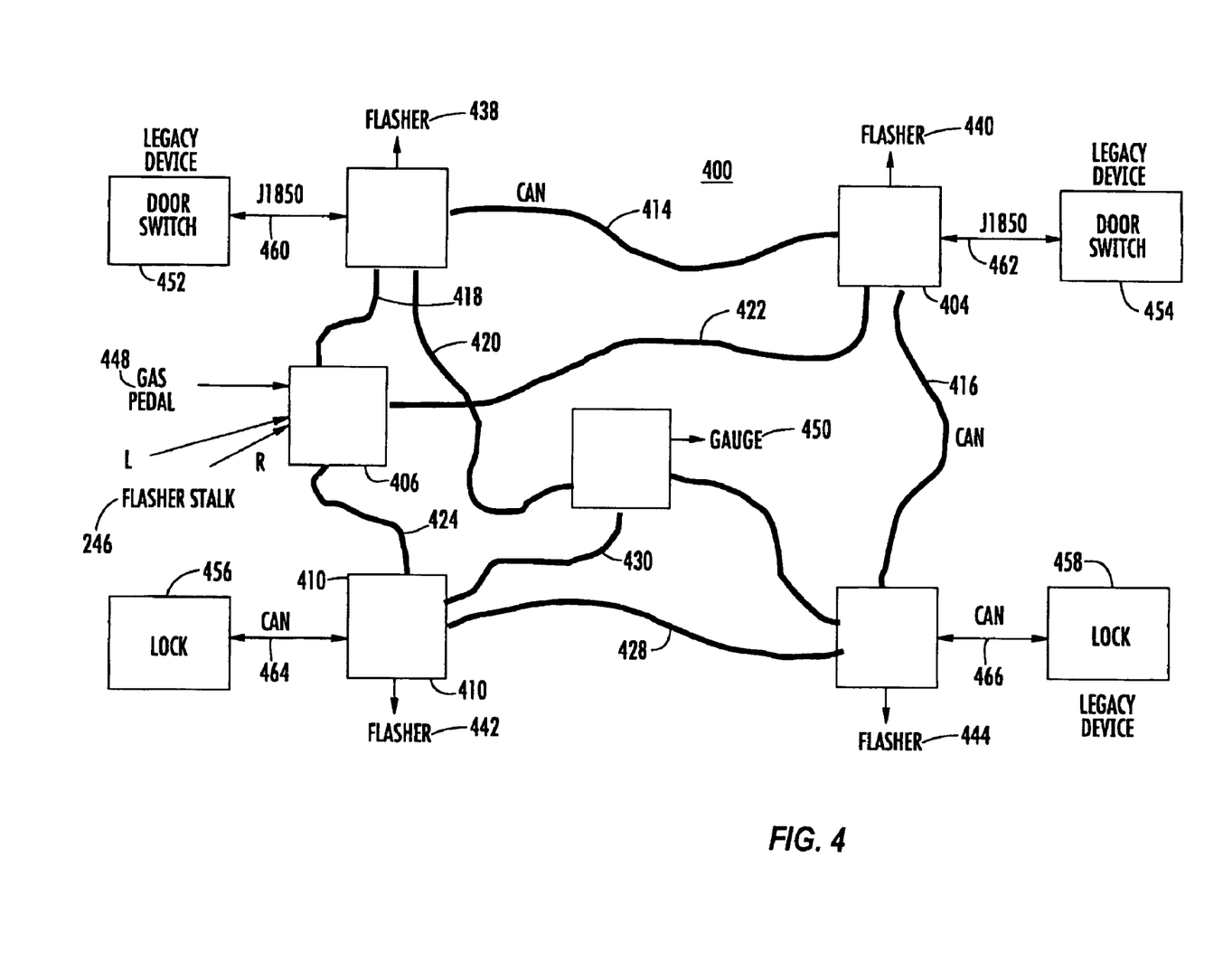
FIG. 4 is a schematic representation of a switch fabric forming a portion of vehicle network and further illustrating disparate communication links.

Referring now to FIG. 4, a network 400 includes a plurality of network elements 402-412 communicatively coupled by communication links 414-430. A plurality of devices 438-450 are coupled at various locations, i.e., to several of the network elements 402-412 of the network 400 by corresponding communication links (not separately identified). Legacy devices 452-458, i.e., devices adapted to communicate according to existing communication protocols such as J1850, CAN, LIN, Flexray, MOST and the like, are also coupled to the network 400. For example, devices 452 and 454, illustrated as door switches, may be coupled to network elements 402 and 404, respectively, by J1850 communication links 460 and 462. Devices 456 and 458, in this example door locks, may be coupled to network elements 410 and 412, respectively, by CAN communication links 464 and 466. Moreover, any of the communication links may be specified according to any suitable, preferably robust transport protocol. As illustrated in FIG. 4, communication link 414 and 416 may be specified according to CAN protocol, while the remaining links may be specified according to TCP/IP, CAN, LIN, Flexray, and the like.

Figure 5:
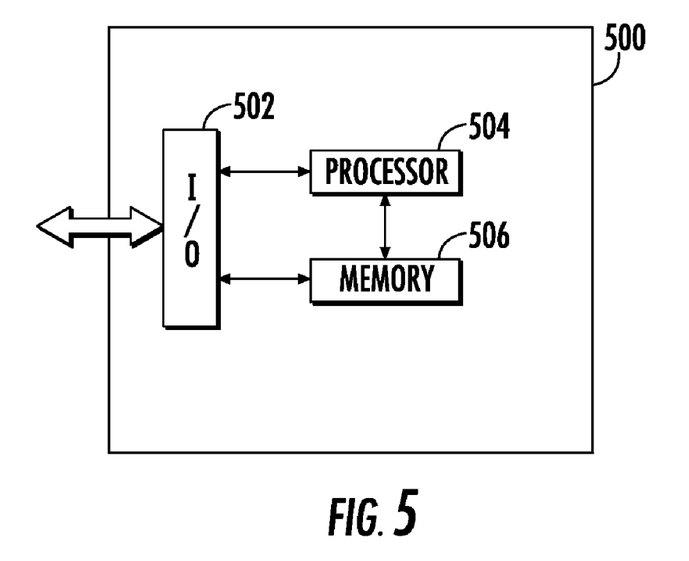
FIG. 5 is a block diagram of a network element that may be used in the networks shown in FIGS. 1-4.

A structure for the network elements may be as illustrated in FIG. 5. The network element 500 in FIG. 5 includes operationally coupled one or more input/output ports, one shown as port 502, a processor 504 and a memory 506. The memory 506 incorporates a control program (not depicted) to direct the processor to function in a manner that facilitates communication of data packets through the associated network. The input/output port 502 is adapted to be coupled to the communication links to send and receive data packets from the network element 500. Because the network element 500 may be coupled to more than one transport media type, the processor operates in accordance with the control program to accept data packets sent via a first transport media, to modify the data packets as necessary for communication via a second transport media and to communicate the data packets over the second transport media. In this manner, the network element may act as a proxy or gateway between the disparate communication media. It will be appreciated that alternate network elements may be used with enhanced functionality or simplified functionality as the application requires. For example, should the network element join connection links according to a single protocol, the processing capability for handling disparate protocols may not be required, and such a network element may be adapted to merely route the data packet according to the route information associated with the data packet.

Figure 6:
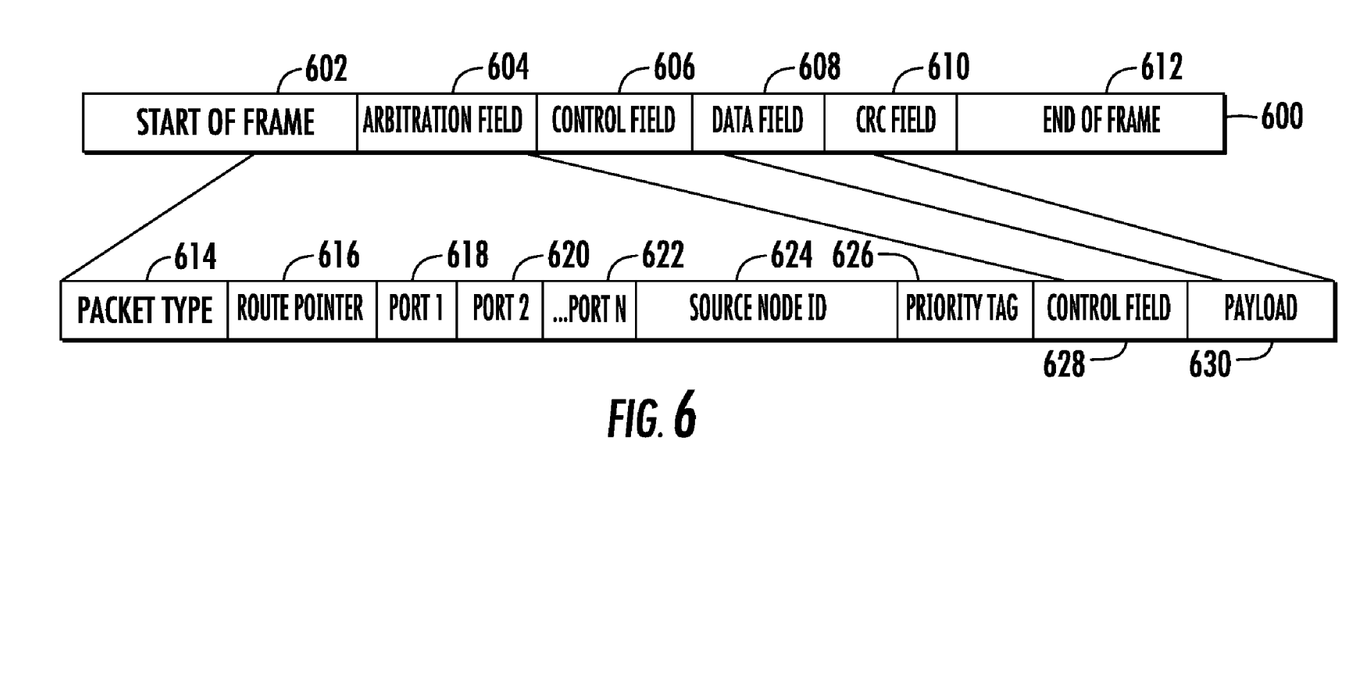
FIG. 6 is a schematic representation of a data packet.

A data packet used for communication within the networks described herein may include a packet type identifier, routing information, source ID information, QoS information and payload. Illustrated in FIG. 6 is an exemplary data packet 600 that may be used in the networks. The data packet 600 may include a start of frame field 602, an arbitration field 604, a control field 606, a data field 608, a cyclical-redundancy check field 610 and an end of frame field 612. The arbitration field 604 may be adapted to contain a packet type identifier 614, a route pointer 616, port identifiers 618, 620 and 622, a source node identifier 624 and a priority tag 626. The packet type 614 identifies the type of data packet such as bearer, discovery, advertisement, fault, control and the like. The route pointer 616, if the data packet contains route information, points to the current hop and is decrement with each hop. The route pointer 616 may also contain other types of route information. The port identifiers 618-622 identify the ports, e.g., network elements, the data packet has traversed. The source node 624 identifies the information source. The priority tag 626 may be reserved for QoS requirements and may contain a code identifying a service level for the data packet. The control field 606 may contain control data particular to the transport media, e.g., it may contain CAN control data if the data packet originated from or is destined for a CAN compliant communication device. The data field 608 contains the data carried by the packet, i.e., the payload.

The data packet 600 may be adapted to facilitate source routing, i.e., the route the data packet will take through the network is determined by the information source and this path information is contained within the data packet itself. The data packet 600 may also be adapted to facilitate destination routing, i.e., the route the data packet will take through the network is determined by each intermediate node and the next node information is contained within the data packet.

The data packet 600 may be adapted from known communication packet structures, such as a CAN data packet. As shown in FIG. 6, the arbitration field 604 is adapted to facilitate communication of data packets within the network 400 according to a number of different serial communication protocols. The arbitration field may also be adapted to contain routing information for communicating the data packet 600 through the network 400, i.e., information may be contained within the route pointer 616 field or otherwise contained within the arbitration filed 604. For example, the routing information may be a fixed label which remains with the data packet throughout the network 400. Each network element of the network 400 then includes a table to direct the data packet through the network 400 according to the label. Alternatively, the packet may be source routed, and the arbitration field may then contain routing information for each hop through the network. A further alternative is that the data packet 600, and particularly the arbitration information is modified at each hop so that it contains information for the next hop. Of course, other fields of the data packet 600 may be used to carry routing information, QoS information, or other types of information.

The networks 200 and 400 may be implemented into existing applications by adapting the communication links 214-232 from existing robust communication medium. In the implementations shown in FIGS. 2-3, the communication links 214-232 may be specified according to the CAN protocol. Alternatively, the communication links 214-232 may be specified according to the LIN, Flexray, J1850, MOST or other protocols. In the implementation shown in FIG. 4, the communication links 414-432 may be specified according to any suitable protocol such as CAN, LIN, Flexray, J1850, MOST and the like. Each of these protocols may define an arbitration mechanism to provide for and permit flow control. Arbitration may be specified to give priority on the communication link to a message with the highest priority. Priority may be indicated within a data packet in a message header, such as the priority tag 626 of the data packet 600. For example, the message header may contain zeros in the most dominant bits. If two network elements try to transmit on the same communication link at the same time, the message with the highest priority, e.g., the lowest value in the dominant bits, will win and the all others will release the communication link.

On initial startup of a network according to the embodiments described herein, such as networks 200 and 400, it necessary to identify all nodes of the network. The term "node" may refer to network elements, including but not limited to those network elements described in connection with networks 200 and 400, switches, routers and any and all coupled devices. It is also necessary to identify message identifiers that are of interest to particular nodes, to assign logical addresses to each node, to create a translation table of identifiers to node logical address, to create a routing table from node to node, and to create one or more back-up routes from node to node. Several levels of service may be associated with this so-called discovery process. For example, and as will be described in more detail, the network may offer nodes capable of multicast, encryption or other capabilities. Nodes may be configured to receive information or to advertise availability of information.

Discovery processes are known in connection with networks, and the commonly used Dijkstra algorithm may be employed to complete a network discovery process and calculate the routing table. These known processes however, assume a totally dynamic network and completes a full discovery process on each power up or upon detection of any failure. Depending on the scale of the network, this discovery process may take several minutes time, which is not practical in an automotive environment where the user expects to be able to enter the vehicle, start it and immediately operate it or where a fault may occur while the vehicle is operating and any significant delay in the completing the discovery process may present a safety concern. Having to wait several minutes for a discovery process to complete would be viewed as a defect, and would be unacceptable to users and manufacturers.

Networks according to the embodiments described herein generally are not totally dynamic. Generally, the network only becomes dynamic upon detecting a failure, i.e., the network is not dynamic until something goes wrong, or when new hardware is added to the network. Therefore, a last known state of the network may be saved and an incremental discovery process may be employed upon detecting a network change. The incremental discovery process may be completed with little or no effect on overall network performance.

FIGS. 7-12 illustrate one example of an incremental discovery process that may be used with networks such as those described herein. The example shown in FIG. 7-12 is intended to illustrate one possible type of incremental discovery process, and it should be appreciated that alternatives to the specific example described may be used.

Figure 7:
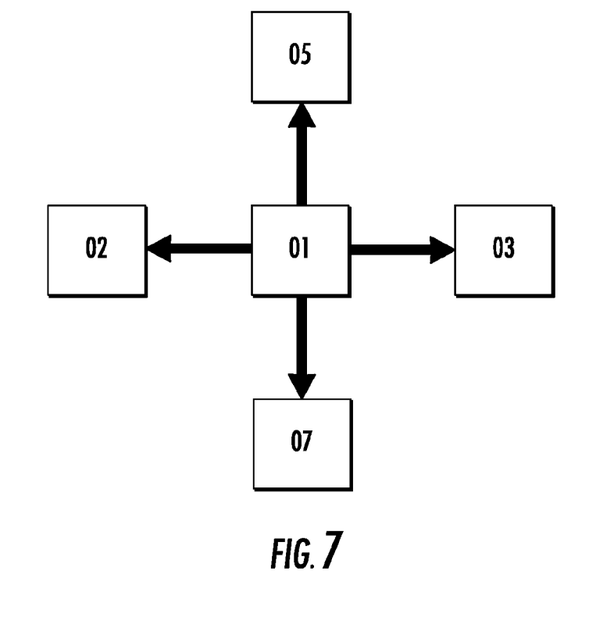
FIGS. 7-12 are schematic diagrams illustrating a network node discovery process that may be used with the networks illustrated in FIGS. 1-4.

Referring then to FIGS. 7-12, upon power up each node is configured to send a "Hello" message to all of its immediate neighbors on all ports coupled to the node. As illustrated in FIG. 7, node 01 sends a hello message to each of nodes 02, 03, 05 and 07. The nodes 01, 02, 03, 05 and 07 may be configured in a manner similar to that illustrated in FIG. 5, wherein the node may include an input/output port, a processor or some minimum form of intelligence to enable sending and receiving hello messages and comparing neighbor tables and a memory, in which its node number, a neighbor table and other routing information may be stored.

The hello message may contain the node number and a copy of the node's local neighbor table. The node will continue to send these local, i.e., 1-hop, hello messages every N seconds, where N is an arbitrarily selected value such that the network is not burdened with hello messages but which is sufficiently frequent to allow early detection of network changes or potential failures. Through these repeated hello messages new connections are discovered and failed or terminated connections are detected by transmission error interrupts generated by the physical layer, e.g., "bus off" error, as is well known.

Figure 8:
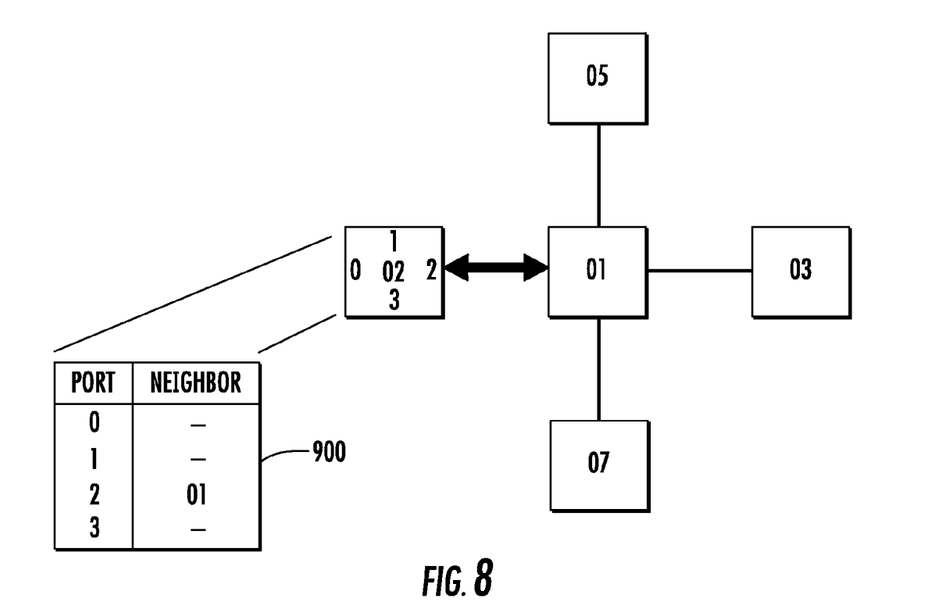
Figure 9:
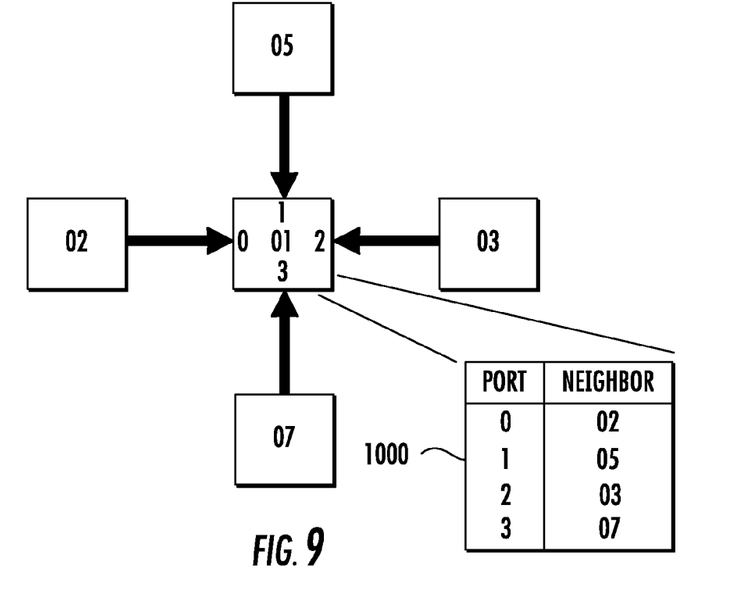

Whenever a node receives a hello message from a neighbor, it looks at its local neighbor table to see if anything has changed, i.e., to see if there is a new neighbor sending to it a hello message. When the network is initialized, which may occur during initial assembly of the vehicle but may occur at other times, there is no routing information stored. That is, each node's neighbor table is blank, and therefore, the nodes will notice something changing with each hello message received and processed. Upon receipt of a hello message from a node at a port for which information is not stored in the local neighbor table, the receiving node updates its local neighbor table to include this information. As illustrated in FIG. 8, the node 02 updates its local neighbor table 900 to indicate that node 01 is connected at port 2. Nodes 02, 03, 05 and 07 also send hello messages that are received by node 01 as shown in FIG. 9. Receipt of these hello messages allows node 01 to generate its own local neighbor table 1000. Through this process of the nodes sending hello messages, each node is able to generate its local neighbor table.

Figure 10:
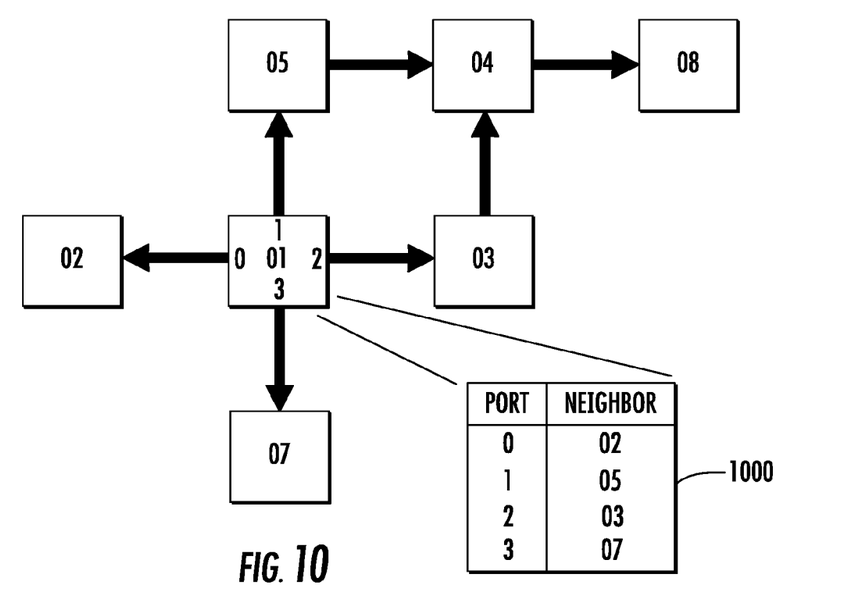
Figure 11:
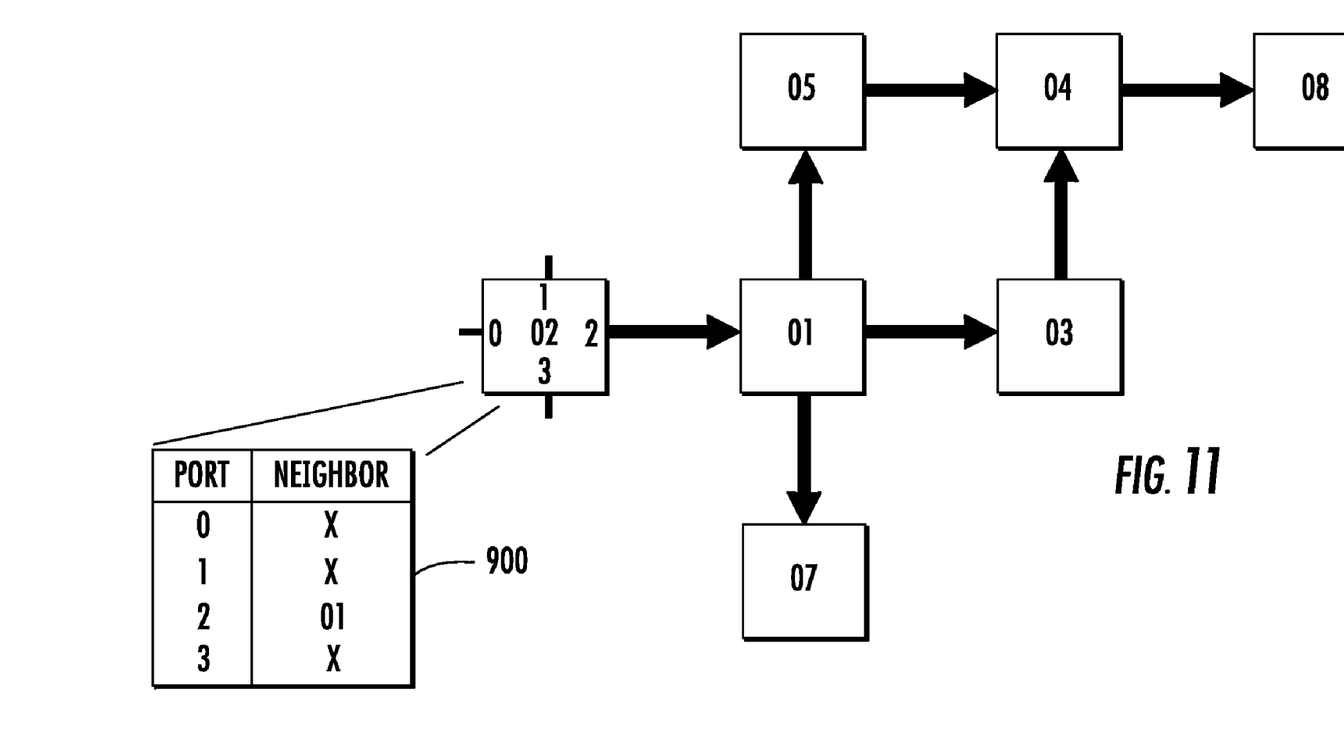

On a normal start up, with a last-known-good local table stored in the node's memory, the node will be able to start effectively communicating immediately. Any network changes will begin to filter throughout the network as nodes discover new/missing neighbors and start broadcasting new neighbor tables (FIGS. 10 and 11).

Figure 12:
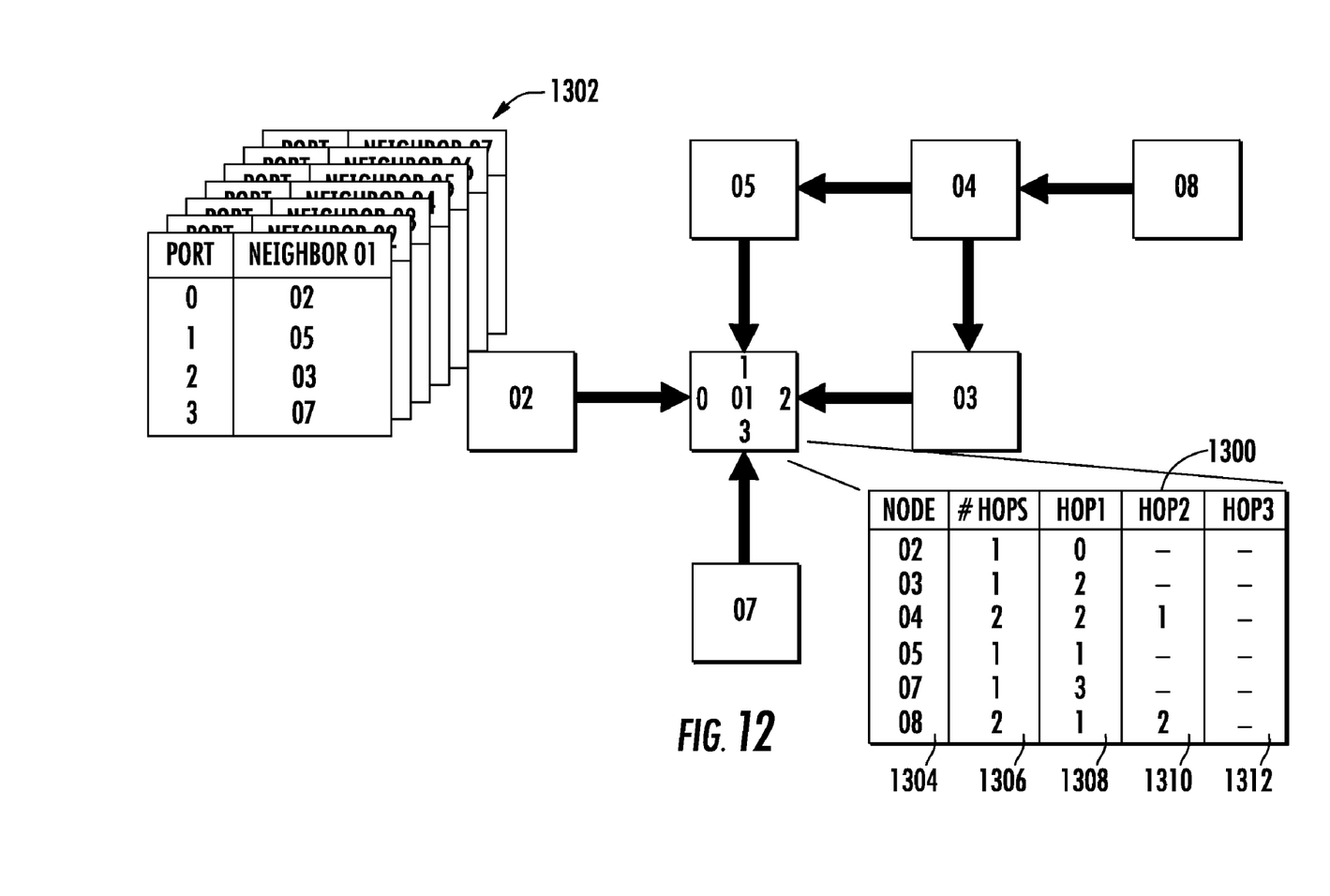

When there is a change in a node's neighbor table, the node then broadcasts its neighbor table for receipt by each other node in the network. Broadcasting of the neighbor tables allows the nodes to generate and store routing tables 1300 as shown in FIG. 12. Given all of the neighbor tables, generally shown as neighbor tables 1302 in FIG. 12, each node may then determine all of the node in the network 1304 and the number of hops 1306 required to reach each other nodes and the intermediary nodes 1308, 1310, 1312 that make up a path to the particular node.

The discovery process may also include periodic checking to determine a status or health of the network. For example, a node may fail to receive a broadcast message containing a node's new neighbor table according to the process described above. This node may become effectively out of sync with the rest of the network until such time as it receives the broadcast message and is able to update its local neighbor table. For this reason, each node may be configured to periodically broadcast a packet containing a checksum for its neighbor table, from which each node is able to verify consistency. The check sum may be sent with other message traffic so that it does not consume bandwidth within the network.

Synchronization may also become an issue in a fault condition. A fault condition may initiate a flurry of rediscovery activity, and it is possible as a result that a node may receive updates out of sequence, i.e., a less up to date table may arrive after the true latest table. Time stamping may be employed to guarantee each node has the latest information.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A method of configuring a network within a vehicle, the network including a plurality of network elements and a plurality of communication links communicatively coupling the plurality of network elements for point-to-point communication, the method comprising the steps of:

storing a last known configuration state of the network;
determining a change in the configuration state of the network to establish a current configuration state, the determining step comprising:
listening at a network element of the plurality of network elements for a message on each communication port of the network element coupled to the network, wherein the message comprises a neighbor table for at least one other network element of the plurality of network elements, and
comparing the neighbor table to a previously stored neighbor table;
point-to-point propagating the current configuration state through the network via the communication links; and
storing the current configuration state at each of the plurality of network elements.

2. The method of claim 1, wherein the steps of storing the last known configuration state and the current configuration state comprise storing at least one neighbor table at each of the network elements and generating and storing a routing table at each of the network elements.

3. The method of claim 1, wherein the message comprises a changed neighbor table.

4. A vehicle comprising:
a plurality of network elements and a plurality of communication links communicatively coupling the plurality of network elements for point-to-point communication;
means for storing a last known configuration state of the network;
means for determining a change in the configuration state of the network to establish a current configuration state, the determining means comprising:
means for listening at a network element of the plurality of network elements for a message on each communication port of the network element coupled to the network, wherein the message comprises a neighbor table for at least one other network element of the plurality of network elements, and
means for comparing the neighbor table to a previously stored neighbor table;
means for point-to-point propagating the current configuration state through the network via the communication links; and
means for storing the current configuration state at each of the plurality of network elements.

5. The vehicle of claim 4, wherein the means for storing the last known configuration state and the current configuration state comprise means for storing at least one neighbor table at each of the network elements and for generating and storing a routing table at each of the network elements.

6. The vehicle of claim 4, wherein the message comprises a changed neighbor table.

7. A vehicle comprising:
plurality of network elements and a plurality of communication links communicatively coupling the plurality of network elements for point-to-point communication;
a controller including a memory, the network elements being responsive to the operation of the controller;
a first software program stored in the memory for directing operation of the controller such that each of the network elements stores a last known configuration state of the network;
a second software program stored in the memory for directing operation of the controller such that each of the network elements determines a change in the configuration state of the network to establish a current configuration state, wherein the second software program comprises a software routine for listening at each network element of the plurality of network elements for a message on each communication port of the network element coupled to the network, wherein the message comprises a neighbor table for at least one other network element of the plurality of network elements, and wherein the software routine causes each network element to compare the neighbor table to a previously stored neighbor table;
a third software program stored in the memory for directing the operation of the controller such that each of the network elements point-to-point propagates the current configuration state through the network via the communication links; and
a fourth software program stored in the memory for directing the operation of the controller such that each of the network elements stores the current configuration state at each of the plurality of network elements.

8. The vehicle of claim 7, wherein each of the last known configuration state and the current configuration state comprise at least one neighbor table stored at each of the network elements and a routing table generated and stored at each of the network elements.

9. The vehicle of claim 7, wherein the message comprises a changed neighbor table.

10. The vehicle of claim 7, wherein the controller comprises a control entity disposed in at least one of the plurality of network elements.

11. The vehicle of claim 7, wherein the controller comprises controller entities disposed in a portion of the plurality of network elements.

* * * * *